United States Patent [19]

McClure

[11] Patent Number: 4,611,249
[45] Date of Patent: Sep. 9, 1986

[54] FLUX SENSITIVE TRACKING

[75] Inventor: Richard J. McClure, San Diego, Calif.

[73] Assignee: Eastman Kodak Company, Rochester, N.Y.

[21] Appl. No.: 730,139

[22] Filed: May 3, 1985

[51] Int. Cl.⁴ .............................................. G11B 5/56
[52] U.S. Cl. ...................................................... 360/77
[58] Field of Search ................................... 360/77, 121

[56] References Cited

U.S. PATENT DOCUMENTS

| | | | |
|---|---|---|---|
| 3,474,432 | 10/1969 | Sevilla | 340/174.1 |
| 3,614,756 | 10/1971 | McIntosh et al. | 360/77 |
| 3,918,091 | 11/1975 | Walraven et al. | 360/77 |
| 4,048,658 | 9/1977 | Nakagawa | 360/9 |
| 4,152,734 | 5/1979 | Louth | 360/70 |
| 4,157,576 | 6/1979 | Hack et al. | 360/77 |
| 4,163,994 | 8/1979 | Sakamoto et al. | 360/70 |
| 4,164,764 | 8/1979 | Joannou | 360/77 |
| 4,164,781 | 8/1979 | Brown | 360/77 |
| 4,179,720 | 12/1979 | Miura | 360/113 |
| 4,313,140 | 1/1982 | Keidl | 360/77 |
| 4,321,634 | 3/1982 | Lehureau | 360/77 |
| 4,346,413 | 8/1982 | Hack | 360/77 |
| 4,347,534 | 8/1982 | Kimura | 360/77 |
| 4,392,163 | 7/1983 | Rijckaert | 360/76 |
| 4,419,700 | 12/1983 | Ragle et al. | 360/77 |
| 4,438,465 | 3/1984 | Moriya et al. | 360/22 |

FOREIGN PATENT DOCUMENTS 2260160  8/1975  France ................................. 360/77

OTHER PUBLICATIONS

IBM Technical Disclosure Bulletin, vol. 18, No. 7, Dec. 1975, pp. 2248-2249, Track Crossing Responsive Device, Paska.

IBM Technical Disclosure Bulletin, vol. 20, No. 9, Feb. 1978, Read/Write Servo Magnetic Head, McEfee.

*Primary Examiner*—George G. Stellar
*Attorney, Agent, or Firm*—Robert F. Cody

[57] ABSTRACT

In accordance with the invention, an extremely narrow control track is provided. By recording such control track cross-wise with respect to data recorded in an adjacent information track, a flux sensitive head may be employed to read the recorded control track flux so as to detect, with great sensitivity, polarized flux directions on either side of the centerline of the control track. Such detected polarized flux directions are transformed into corresponding drive signals for corrective head (and/or medium) positioning, thereby to cause the flux sensitive head to follow the centerline of the control track.

5 Claims, 5 Drawing Figures

FLUX SENSITIVE TRACKING

BACKGROUND OF THE INVENTION

1. Field of the Invention

This invention relates in general to magnetic recording and more particularly to improved apparatus for providing tracking control during the playback of recorded signal information.

2. Description Relative to the Prior Art

There is a trend toward the packing of greater and greater amounts of data on magnetic storage devices such as floppy magnetic discs and magnetic tape. Implicit in such trend is the requirement that data tracks on such recording devices be narrower and narrower, and more closely packed together In the recently announced 3.3 megabyte floppy disc, for example, the recording tracks thereof are 0.0047" wide, and on a 0.0052" pitch (guardband between tracks of 0.0005") Similarly, with a high-track-density multitrack magnetic head, say of a type that provides 400 tracks per inch, tracks would be 0.0020" given guardbands of 0.0005". It is clearly of concern, therefore, that during playback of recorded information, the information so recovered be from the correct track, and not from a neighboring one.

It is known in the art to record tracking control signals in a magnetic recording medium as a vehicle for preventing head-to-medium wander during playback of information recorded in the medium. Representative prior art in this connection may be found in U.S. Pat. No 3,474,432 which depicts the use of various prerecorded frequencies in respective tracks, the signals being mixed in such a way as to cause head position error signals to be generated in response to head-to-medium wander. Similarly, more recently issued U.S. Pat. No. 4,258 398 calls for the use of paired pre-recorded tracks as signal-sources for head orienting/positioning in connection with a multitrack configuration. Other and varied tracking control techniques have been demonstrated and taught in the art, albeit that such techniques are universally wasteful of medium (relatively wide tracking-control tracks), exhibit less than optimally tight-control and, if narrowed, are wanting when it comes to the matter of sensitivity.

A characteristic which is peculiarly common to prior art tracking-control techniques such as those mentioned above is that such techniques are dependent on flux rate-of-change while reading a control track. Attendantly, such techniques are virtually useless at low playback speeds and/or when the recorded control track signal is of too short a wavelength as to be readable during playback of the control track.

SUMMARY OF THE INVENTION

In accordance with the invention, an extremely narrow control track is provided. By recording such control track cross-wise with respect to data recorded in an adjacent information track, a flux sensitive head may be employed to read the recorded control track flux so as to detect, with great sensitivity, polarized flux directions on either side of the centerline of the control track. Such detected polarized flux directions are transformed into corresponding drive signals for corrective head (and/or medium) positioning, thereby to cause the flux sensitive head to follow the centerline of the control track Typically, a data-reading head is physically secured to the flux sensitive head so that the two heads move together Given that the control track records a continuous dc signal, positioning of the flux sensitive head with respect thereto is totally independent of flux rate of change within the control track. If it is desired, however, that apparatus for effecting such positioning to the control track be ac-responsive, the cross-wise recorded control track may be composed of alternating regions (along the length of the control track) of oppositely polarized recorded signals. As the flux sensitive head, then, drifts to one or the other side of the control track centerline, an error signal of one or an opposite phase is produced, wherefrom the flux sensitive head is forced to follow the control track centerline, and thereby cancel the phased error signal.

The invention will now be described with reference to the figures wherein

Figure 1:
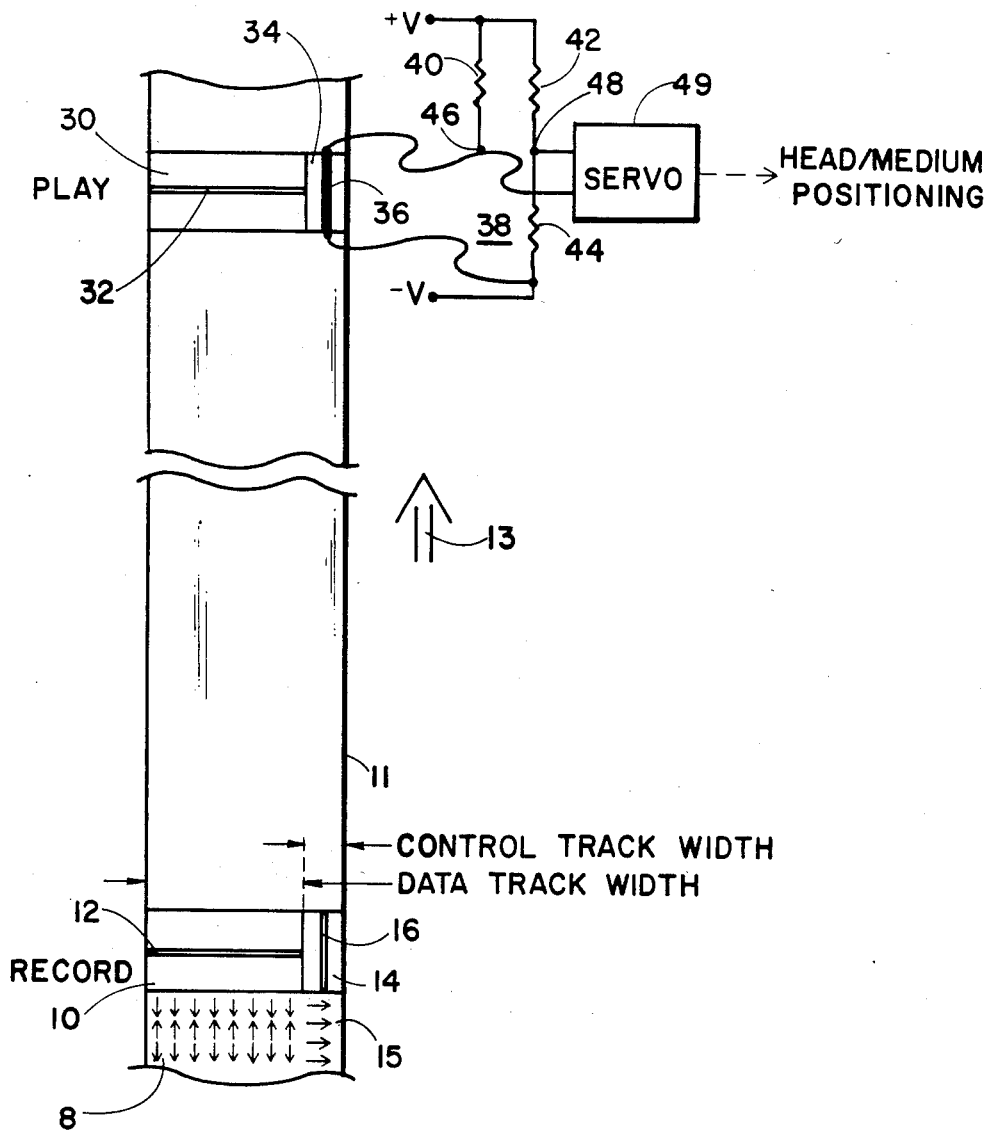
FIG. 1 is a schematic drawing of one embodiment of the invention.

Referring to FIG. 1, a data track 8 of the indicated track width is formed by a magnetic record head 10 having its transducer gap 12 disposed across the width of the track 8 . . . the medium 11 which supports the track 8 being disposed for relative medium-to-head movement in the direction of the arrow 13. Outbound of the data recording head 10 is a record head 14 for recording an extremely narrow control track 15. The transducer gap 16 of the head 14 is oriented in the direction of the length of the control track 15; thus, the narrowness of the track 15 is determined by the shortness of the gap 16 of the head 14. In its preferred form, the invention calls for the heads 10, 14 to be bonded together: the head 10 may be either a single track head or a multitrack head; and the head 14 is, preferably, a thin-film head formed on the end face of the head 10, whereby the cotrol track 15, as formed by the gap 16 of the head 14, will be in "media-saving" close proximity to the data track 8.

Ideally (i.e., not necessarily) the medium 11 is of the type in which the recording particles thereof are not "oriented", whereby data and control track recording by the heads 10, 14 is not preferential for one (12) or the other (16) of the head gaps. It will be appreciated, therefore, that the head 10, in response to an alternating data signal applied to its coil (not shown) effects recorded patterns with alternating flux directions. By contrast, at least in this embodiment of the invention, a dc signal is applied to the coil (not shown in FIG. 1) of the head 14, thereby to record a non-alternating pattern of flux directions in the narrow control track 15.

Figure 2A:
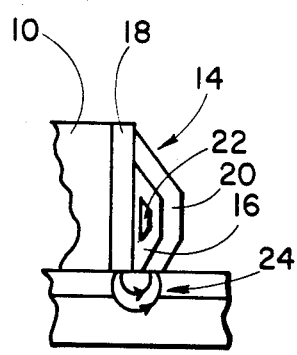
FIGS. 2a, 2b, 2c are diagrammatic views useful in explaining the workings of apparatus according to the invention.
Figure 2B:
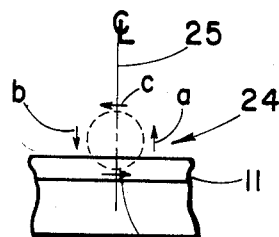

Control track recording by means of the head 14 is illustrated in FIG. 2a which shows a thin-film structure (magnetic substrate 18, magnetic yoke film 20, transducer gap 16, coil member 22) producing and recording a unidirectional flux pattern 24 in the recording medium 11. The unidirectional recorded flux pattern 24, FIG. 2b, exhibits a field that is respectively out of (vector a) and into (vector b) the medium 11 on either side of the centerline 25 of the control track 15.

Turning again to FIG. 1, a data-reading reproduce head 30 (single track, or multitrack, as the case may be) having a transducer gap 32 is disposed to read data signals (alternating flux directions) recorded in the data track 8. A flux sensitive head 34, such as a thin-film magneto-resistive device formed on the end face of the reproduce head 30, is disposed to read the unidirectional flux pattern of the control track 15. Positioning of the head 34 is, accordingly, synonymous with the positioning of the head 30. Magneto-resistive devices, as is known (e.g. U.S. Pat. Nos. 4,136,371, 4,388,662 and 4,413,296), exhibit resistance changes in response to variations in applied flux. As indicated in FIG. 1, the magneto-resistive element 36 of the flux sensitive head 34 forms part of a bridge circuit 38 comprised of resistors 40, 42, 44, the voltage developed across the bridge junction points 46, 48 being applied to a servo 49 disposed to position the head(s) 34 (30), . . . or the medium . . . to maintain alignment of the magneto-resistive device 36 along the centerline 25 of the track 15. When the resistance of the magneto-resistive device 36 decreases, the voltage at 46 decreases to cause head (or medium) positioning to be one way; when the resistance of the magneto-resistive device 36 increases, the voltage at 46 increases to cause head (or medium) positioning to be the other way, thereby to effect the desired tracking.

Figure 2C:
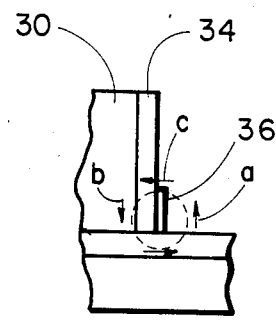

To see how the magneto-resistive device 36 of the flux sensitive head 34 responds to the unidirectional flux pattern of the recorded control track 15, reference should be had to FIG. 2c which shows an edge view of the magneto-resistive device 36. Note that the field vector c, being perpendicular to the plane of the magneto-resistive device 36, has virtually no influence on the resistance of such device; by contrast, the field vectors a, b respectively oppositely influence the resistance of the magneto-resistive device 36. When the head 34 drifts to the right as in FIG. 2c, the resistance of the magneto-resistive device 36 goes one way, and when the head 34 drifts to the left as in FIG. 2c, the resistance goes the other way, whereby the servo 49 receives a properly polarized signal to return the head 34 to the center of the control track 15. Because of the thinness of the magneto-resistive device 36, taken with the narrowness of the control track 15, even the slightest wander of the head 34 is immediately detected, and with great sensitivity.

Figure 3:
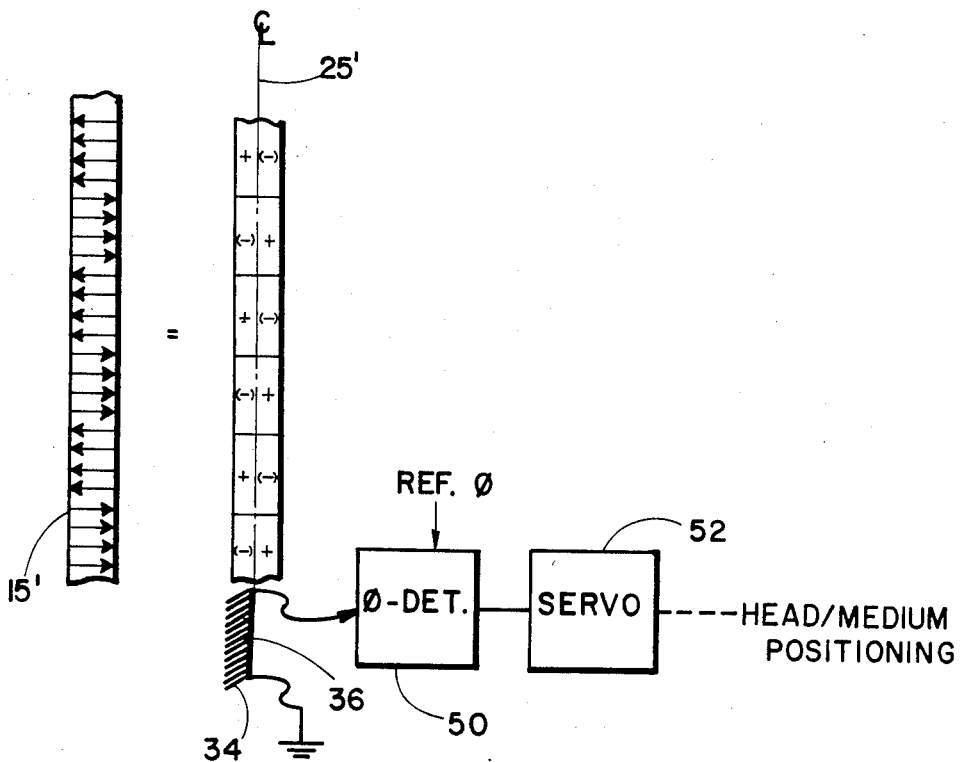
FIG. 3 is a schematic diagram illustrating another embodiment of the invention.

As indicated above, whereas the configuration of FIG. 1 is designed for dc response, apparatus according to the invention may also be operated so as to have ac response. For example, by applying an alternating control-track signal to the record head 14, a control track 15' as indicated in FIG. 3 is generated. Such a track 15' is, as seen by the magneto-resistive device 36, comprised of alternating polarized regions to opposite sides of the centerline 25' of the control track. As head-to-track wander starts to occur, an appropriately phased ac signal (of amplitude corresponding to the degree of wander) is generated. By applying such signal to a phase detector 50, a servo 52 (responsive to the output of the phase detector 50) positions the head 36 (or the medium) so as to cancel the servo 52 input error signal in the following manner:

1. When the reference phase is the same as the phase of the generated signal: servo drives one way 2. When the reference phase is opposite to the phase of the generated signal: servo drives in the reverse direction.

The invention has been described in detail with particular reference to certain preferred embodiments thereof, but it will be understood that variations and modifications can be effected within the spirit and scope of the invention. For example, although the invention is described with relation to a system for controlling the position of a reproduce head to a control track, the concepts hereof may be employed to control the position of any kind of structure to a control track. Further, while the apparatus of FIG. 1 is shown in contemplation of apparatus that lays down its own control track, it is within the scope of the invention to employ media having pre-recorded control tracks in which the flux patterns thereof are crosswise with respect to flux patterns associated with data. Still further, it is within the concept of the invention to provide address code flux patterns for respective control tracks, whereby the reproduce head may be automatically driven to, and then operated so as to ride along, a given data track.

What is claimed is:

1. A magnetic recording medium having therein
  a. a data recording track in which the particles thereof are magnetized in the direction of the length of said track and
  b. a control track in which the particles thereof are magnetized in a direction which is substantially cross-wise with respect to the length of said control track,
  the magnetization of the particles of said control track alternating directionally along the length of said control track.

2. Magnetic recording apparatus comprising
  a. a first magnetic record head, said head having a transducer gap for recording a data signal along the length of a magnetic recording track of a recording medium,
  b. a second magnetic record head, said head having a transducer gap that is perpendicular to the transducer gap of said first magnetic head, said second magnetic record head being disposed to record a crosswise control track that parallels the length of the track that records said data signal,
  c. means for applying an alternating signal to said second magnetic record head to cause the magnetization along said control track to alternate directionally along the length thereof.
  d. a playback transducer cooperative with said recording medium for sensing the recorded data signals thereof,
  e. flux sensitive means responsive to the flux emanating from said cross-wise recorded control track, and
  f. phase sensitive means for receiving the signal of said control track and for varying the relative positions of said recording medium and said playback head to cause said playback transducer to follow the magnetic recording track in which said data signal is recorded.

3. The apparatus of claim 2 wherein said first and second magnetic record heads are bonded together, and wherein said playback transducer and said flux sensitive means are also bonded together.

4. The apparatus of claim 2 wherein said flux sensitive means is a magneto-resistive element deposited on the end face of said playback transducer.

5. The apparatus of claim 4 wherein the plane of said magneto-resistive element is aligned respective of said control track with the gap of said second magnetic record head.

* * * * *